US012645906B1

(12) United States Patent
Scruggs

(10) Patent No.: US 12,645,906 B1
(45) Date of Patent: *Jun. 2, 2026

(54) PAYMENT MODULE INSERTION MECHANISM

(71) Applicant: InterActive Cards, Inc., Lakeland, FL (US)

(72) Inventor: Michael Scruggs, Lakeland, FL (US)

(73) Assignee: InterActive Cards, Inc., Lakeland, FL (US)

( * ) Notice: Subject to any disclaimer, the term of this patent is extended or adjusted under 35 U.S.C. 154(b) by 256 days.

This patent is subject to a terminal disclaimer.

(21) Appl. No.: 18/418,555

(22) Filed: Jan. 22, 2024

Related U.S. Application Data

(63) Continuation of application No. 17/179,623, filed on Feb. 19, 2021, now Pat. No. 11,880,733.

(Continued)

(51) Int. Cl.

| | |
|---|---|
| *G06K 19/077* | (2006.01) |
| *B32B 3/06* | (2006.01) |
| *B32B 3/26* | (2006.01) |
| *B32B 15/082* | (2006.01) |
| *B32B 15/095* | (2006.01) |
| *B32B 27/08* | (2006.01) |
| *B32B 27/30* | (2006.01) |

(Continued)

(52) U.S. Cl.
CPC .......... *G06K 19/07722* (2013.01); *B32B 3/06* (2013.01); *B32B 3/266* (2013.01); *B32B 15/082* (2013.01); *B32B 15/095* (2013.01); *B32B 27/08* (2013.01); *B32B 27/304* (2013.01); *B32B 27/40* (2013.01); *G06K*

*19/07724* (2013.01); *G06Q 20/341* (2013.01); *B32B 2250/03* (2013.01); *B32B 2425/00* (2013.01)

(58) Field of Classification Search
CPC .......... Y10T 428/22; Y10T 428/24273; Y10T 428/24322; Y10T 428/24331; Y10T 428/24777; B32B 3/00; B32B 3/02; B32B 3/06; B32B 3/08; B32B 3/26; B32B 3/266; B32B 2425/00; G06K 19/067; G06K 19/07
USPC ........ 428/67, 81, 83, 137, 138, 192; 902/25, 902/26, 27, 28, 29
See application file for complete search history.

(56) References Cited

U.S. PATENT DOCUMENTS

| | | | |
|---|---|---|---|
| 11,880,733 B1 * | 1/2024 | Scruggs ................ | B32B 15/095 |
| 2018/0025261 A1 * | 1/2018 | Mosteller .............. | B32B 15/085 |
| | | | 235/375 |

FOREIGN PATENT DOCUMENTS

| | | | | |
|---|---|---|---|---|
| DE | 10219306 A1 * | 11/2003 | ....... | G06K 19/07769 |
| EP | 1033676 A1 * | 9/2000 | ....... | G06K 19/07745 |

(Continued)

OTHER PUBLICATIONS

Machine translation (Espacenet) of WO 2019/245068 A1. Translated Nov. 28, 2025. (Year: 2025).*

(Continued)

*Primary Examiner* — Maria V Ewald
*Assistant Examiner* — Ethan A. Utt
(74) *Attorney, Agent, or Firm* — Andrew Behrens; Trenam Law

(57) ABSTRACT

A metal surface card in which the metal surface is formed by a metal insert configured to be retained by interlocking shapes of the metal insert and molded polymer material (Continued)

sandwiched between the metal insert and an opposing surface of the card which is not metal.

17 Claims, 8 Drawing Sheets

Related U.S. Application Data

(60) Provisional application No. 62/978,931, filed on Feb. 20, 2020.

(51) Int. Cl.
    *B32B 27/40*        (2006.01)
    *G06Q 20/34*      (2012.01)

(56)           References Cited

FOREIGN PATENT DOCUMENTS

EP         1033677 A1 *  9/2000  ....... G06K 19/07747
WO    WO-2019245068 A1 * 12/2019  ............... B32B 7/12

OTHER PUBLICATIONS

Machine translation (Google Patents) of DE 10219306 A1. Translated Jan. 23, 2026. (Year: 2026).*
Machine translation (Google Patents) of EP 1033676 A1. Translated Jan. 23, 2026. (Year: 2026).*
Machine translation (Google Patents) of EP 1033677 A1. Translated Jan. 23, 2026. (Year: 2026).*

* cited by examiner

PAYMENT MODULE INSERTION MECHANISM

CROSS-REFERENCE TO RELATED APPLICATIONS

This nonprovisional application is a continuation of and claims priority to nonprovisional application Ser. No. 17/179,623, filed Feb. 19, 2021 by the same inventor(s), which claims priority to provisional application No. 62/978,931, filed Feb. 20, 2020 by the same inventor(s).

FIELD OF THE INVENTION

The present invention is in the field of transaction and similar cards having a metal, rather than plastic, composition.

BACKGROUND OF THE INVENTION

Metal cards are a relatively recent innovation in the financial transaction card industry, having been introduced approximately a decade ago. Metal cards have become increasingly popular and have been marketed as a more prestigious variant of the familiar all plastic credit card. Added weight, rigidity, more elegant decoration, and perceived ruggedness have made these cards popular with customers who desire premium quality and service. Card manufacturers are constantly trying to apply the latest advances to metal cards. Currently there is a desire to introduce contactless payment capability, biometric authentication, and dynamic secret codes to metal cards.

Metal cards are available in at least two varieties: metal surface cards and embedded metal cards.

Metal surface cards have a metal surface. The metal surface can be decorated in all the ways and methods that any metal product can be decorated such as by machining, hammering, laser etching, chemical etching and embossing to name just a few. The metal can be further decorated by typical metal electro-plating processes, printing, painting and PVD (physical vapor deposition). These are meant as examples of decorating processes not as a complete and exhaustive list of all possibilities. The metal surface of the card is typically laminated to plastic films commonly used in the card industry such as PVC and PET to create the opposite surface. Special laminating adhesives are used to improve the bond between the metal and plastic film. This bond between the metal and plastic layers has been susceptible to delamination due to dissimilar expansion rates of the materials either because of temperature, moisture absorption or mechanical bending. Other issues with this type of card are difficulty embedding payment module and no easy way of connecting the payment module to antenna or other types of electronic circuits positioned below the metal surface.

Embedded metal cards have metal embedded in the core of the card with the outer surfaces of the card being PVC or other typical card material. This card has benefits over the metal surface card because magnetic media is easily applied to conventional PVC materials, the metal piece embedded in the card can be shaped so that payment module embedding is not interfered with by the metal piece and connections can be made between very thin electronic components such as antennae and the payment module even though they may be opposite sides of the embedded metal piece.

BRIEF SUMMARY OF THE INVENTION

The present invention is generally directed to a molded card having a metal surface having a rear layer, a metal insert and a molded polymer material sandwiched between the rear layer and metal insert in which the metal insert is configured to be retained by interlocking shapes of the metal insert and the molded polymer material.

In further aspects of the present invention, interlocking shapes can be formed along an outside edge of the metal insert and/or within an aperture configured within the metal insert which can be filled with the molded polymer material and be configured to be larger than a payment module so that molded polymer material prevents shorting with the metal insert.

Accordingly, it is an object of the present invention to provide an improved metal surface card.

This and further objects and advantages will be apparent to those skilled in the art in connection with the drawings and the detailed description of the invention set forth below.

BRIEF DESCRIPTION OF THE DRAWINGS

For a fuller understanding of the invention, reference should be made to the following detailed description, taken in connection with the accompanying drawings, in which.

DETAILED DESCRIPTION OF THE INVENTION

Figures 1, 2, 2A, 2B:
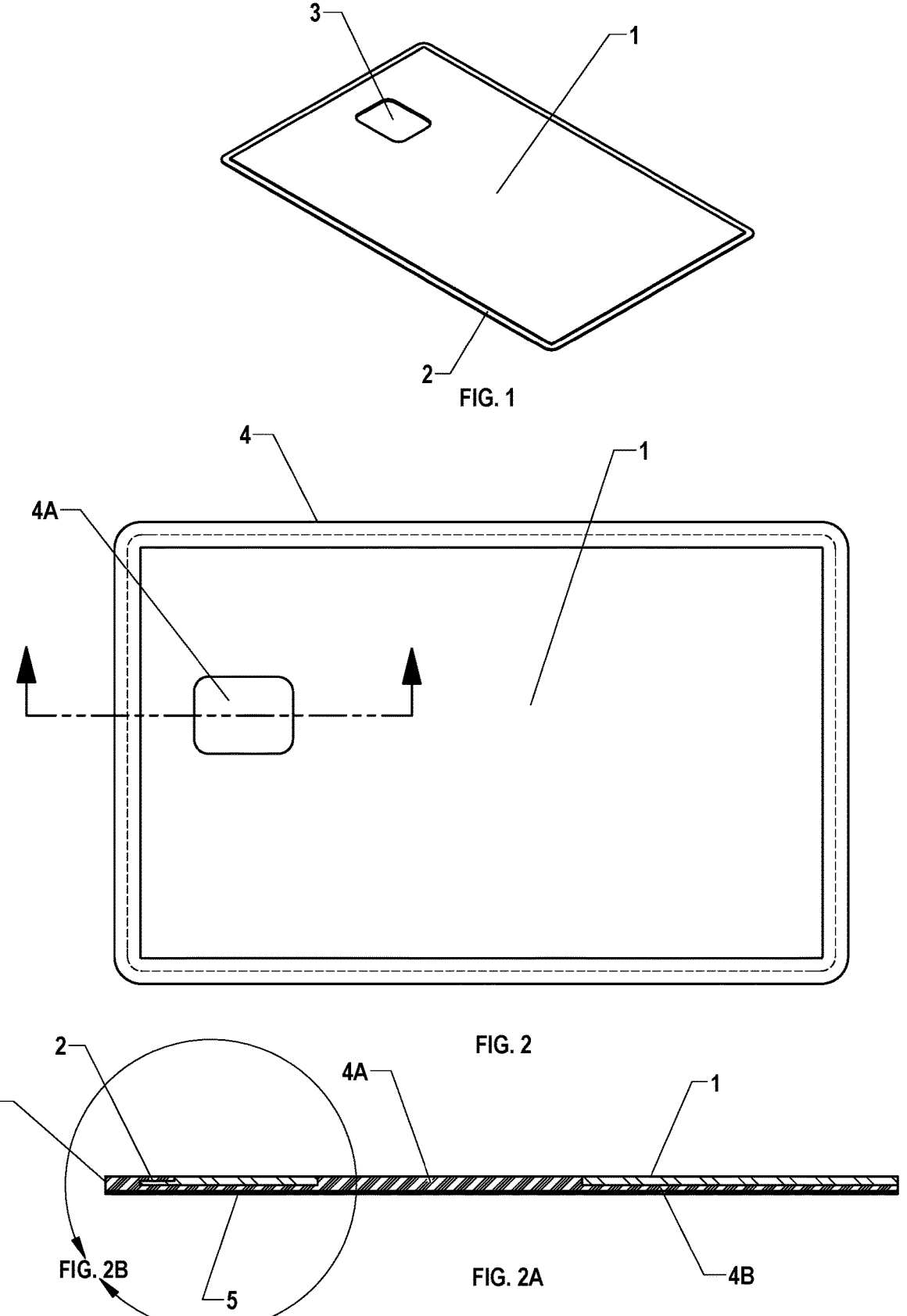
FIG. 1 shows a metal insert (1). Also shown is a lip (2) used to form a tongue and groove connection with polymer (4) which is shown in FIGS. 2 and 2A. An aperture (3) for the payment module is also shown.
FIG. 2 is a front view of a molded card showing the metal insert (1) and the molded polymer (4) creating the edge of the card. The section line in FIG. 2 defines the partial section view shown in FIG. 2A.
FIG. 2A shows a partial section of the left edge of the card that includes the polymer filled aperture (4A) and the tongue and groove connection created by the lip (2) of the metal insert (1) and the molded polymer (4). Also shown in FIG. 2A is polymer filled gap (4B) between the metal insert (1) and the opposite surface or rear layer (5) of the card.
FIG. 2B is a partial blow-up of FIG. 2A.
Figure 2B:
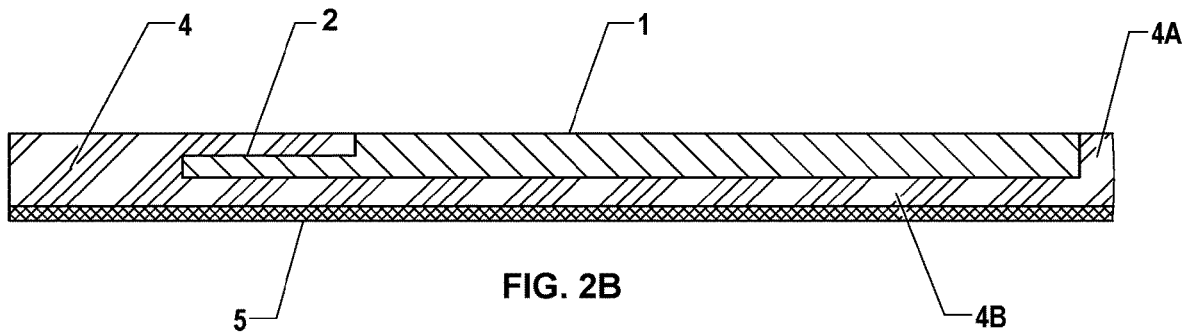
Figure 3:
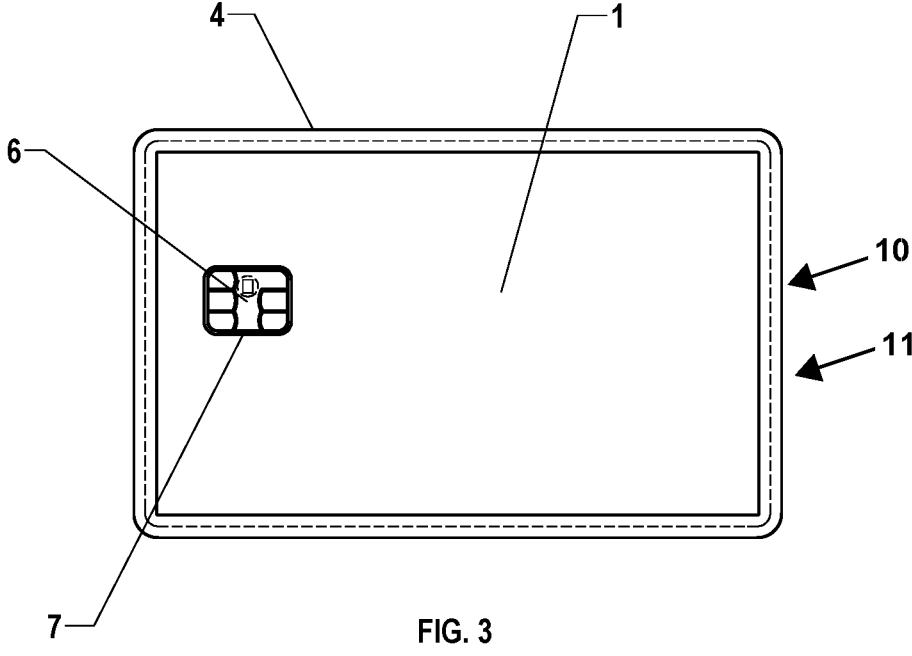
FIG. 3 shows a front view of a molded card (10) with an outer peripheral edge (11) having payment module (6) installed. Also shown is an insulating polymer boundary (7) around the installed payment module (6). This insulating polymer boundary (7) between the electrically active contacts of the payment module (6) and the metal insert (1) is made possible because the payment controller aperture (3) is made larger than the payment module.
Figure 4:
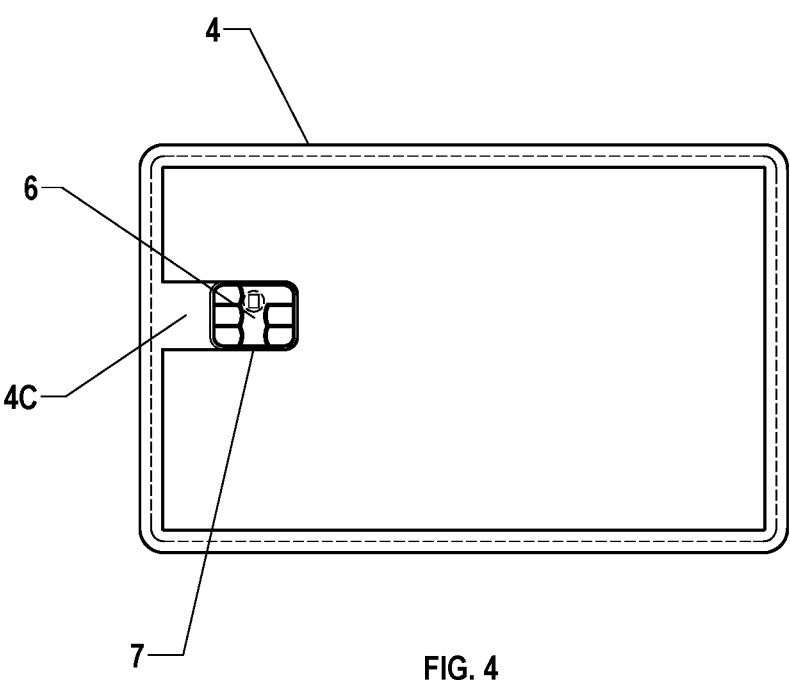
FIG. 4 shows a modification of the card shown in the prior drawings that extends the insulating polymer boundary (7) to the edge of the molded polymer (4) that creates the edge of the card. This creates a non-conductive pathway (4C) from the edge of the card to the payment module. This is useful if it is desirable to not coat the metal insert (1) with a non-conductive material to prevent shorting when the card is inserted in a point-of-sale terminal.
Figures 5, 6, 6A:
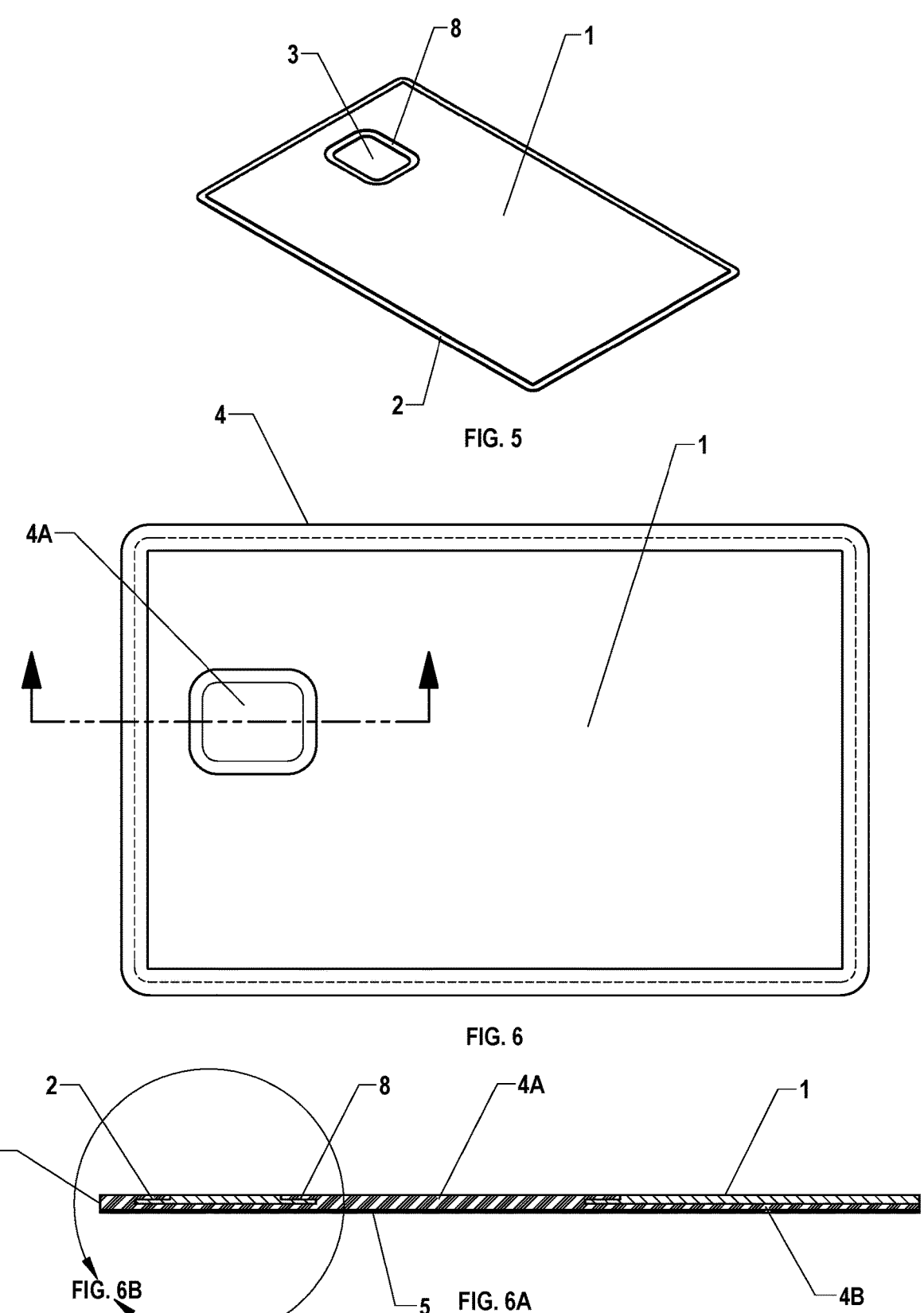
FIG. 5 shows an alternate metal insert (1) design adding an edge (8) around the perimeter of the aperture (3) that is similar to the lip (2) around the perimeter of the metal insert (1). This edge (8) provides additional strength if desired or necessary in the area of the payment module.
FIG. 6 is a front view of a molded card with the metal insert (1) described in FIG. 5.
FIG. 6A shows a partial section of the left edge of the card that includes the polymer filled aperture (4A) with the edge (8) described in FIG. 5.
Figure 6B:
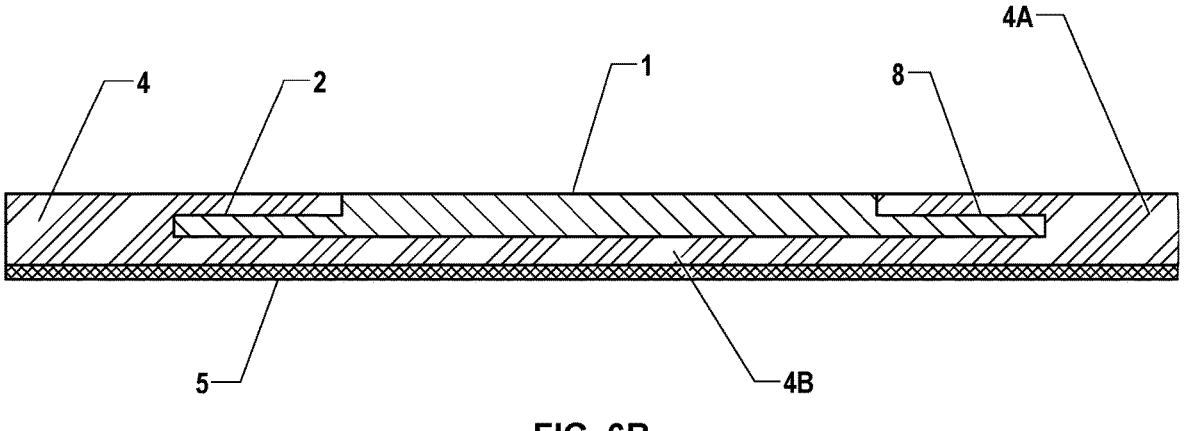
FIG. 6B is a partial blow-up of FIG. 6A.
Figure 7:
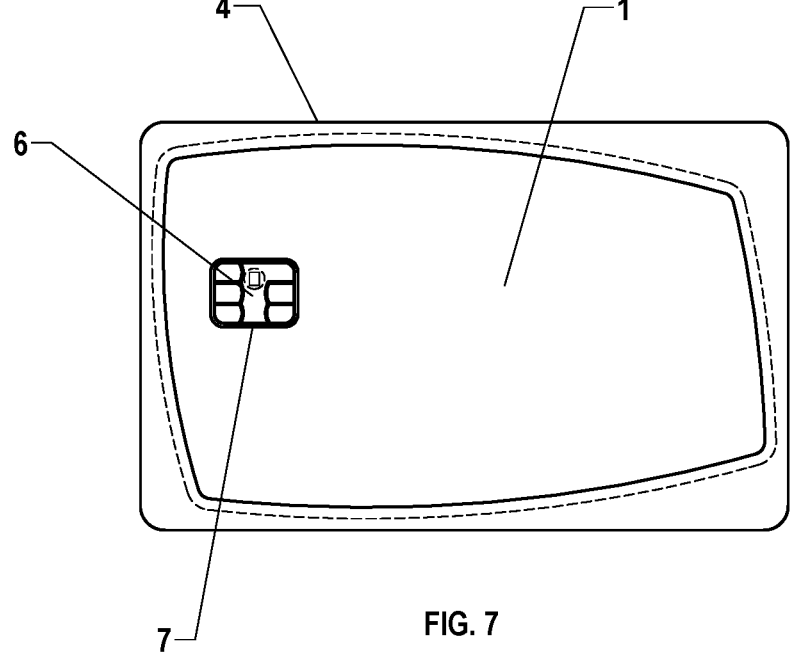
FIG. 7 shows another metal surface card having an irregularly shaped metal insert (1). The metal insert (1) does not have to be rectangular but can be shaped according to utilitarian or artistic requirements.
Figures 8, 9, 9A, 9B:
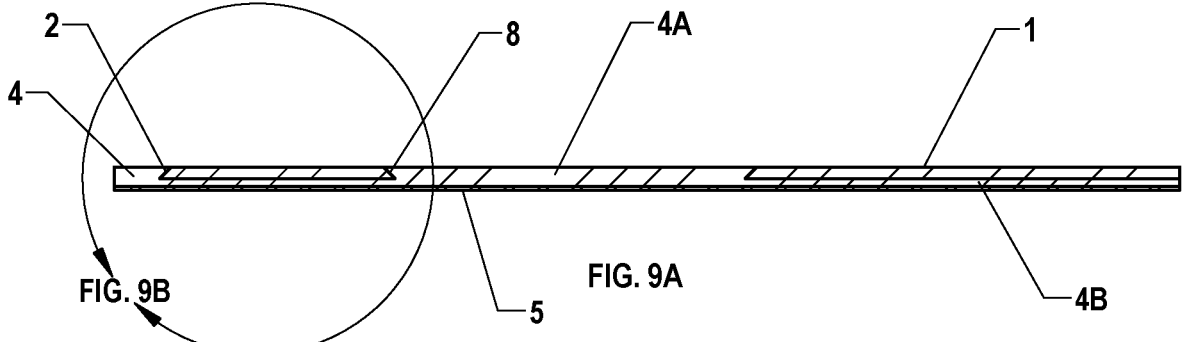
FIG. 8 shows another metal insert (1). Also shown is a lip (2) used to form a chamfer connection with polymer (4) which is shown in FIGS. 9 and 9A. An aperture (3) for the payment module is also shown. Edge (8) around the perimeter of the aperture (3) is similar to the lip (2) around the perimeter of the metal insert (1). Edge (8) provides additional strength if desired or necessary in the area of the payment module.
FIG. 9 is a front view of a molded card showing the metal insert (1) and the molded polymer (4) creating the edge of the card. The section line in FIG. 9 defines the partial section view shown in FIG. 9A.
FIG. 9A shows a partial section of the left edge of the card that includes the polymer filled aperture (4A) and the chamfer connection created by the lip (2) of the metal insert (1) and the molded polymer (4) and the chamfer connection created by the edge (8) around the perimeter of the aperture (3) and the polymer filler aperture (4A).
FIG. 9B is a partial blow-up of FIG. 9A.
Figure 9B:
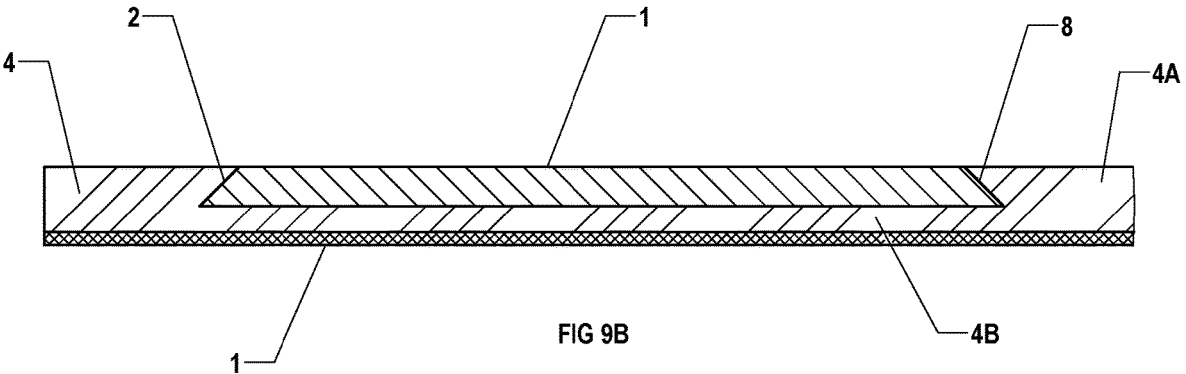

In accordance with the present invention a molded card (10) has a metal surface formed from a metal insert (1). The metal insert (1) is configured to be retained by interlocking shapes of the metal insert (1) and the molded polymer material (4) which is sandwiched between the metal insert (1) and an opposing outer surface of the molded card (10) (which may be a rear layer (5) in the molding process with electronic components attached to an inside surface).

In one especially preferred embodiment, the metal insert (1) does not extend completely to the outer peripheral edge (11) of the molded card (10). The outer peripheral edge (11) of the card (10) is a molded polymer material (4) such as polyurethane and the metal surface insert (1) has a lip (2) that is surrounded by the polymer material (4) during molding. The lip (2) of the metal insert (1) acts as a "tongue" and slot (12) of polymer material (4) acts as a "groove" to establish a tongue and groove feature. The tongue and groove connection makes delamination from the edge impossible as the metal insert (1) is retained by the molded polymer (4). Additionally, the bond between the metal insert (1) and the polymer (4) is not critical as the metal insert (1) is retained by the interlocking shapes of the metal insert (1) and the molded polymer (4). Shapes such as tapers or other interlocking shapes can be used in place of the tongue and groove method.

It is especially desirable that the metal insert (1) be configured with an aperture (3) located in the position of an ISO defined payment module. The aperture (3) can be configured with a lip (8) or other shape around the aperture (3) that can be surrounded by the polymer material (4) during molding. This aperture (3) is filled during molding with the polymer material (4) creating an easily machinable area for creating a pocket for the installation of the payment module. The resulting polymer filled aperture (4A) also provides access to the polymer filled space between the metal insert (1) and the opposite surface of the card. The polymer lined space (4A) can be used for electronics such as antenna, circuit boards containing batteries, displays, biometric sensors and other components. The access provided by the polymer filled aperture (4A) to the polymer filled space can be used to make electric connections between the payment module and any electronics installed in the polymer filled space. In another preferred embodiment, the aperture (3) is larger than electronics (e.g., a payment module) inserted into the aperture (3) and the polymer filled within the aperture (3) creates an insulation layer between electronics inserted into the aperture (3) and the metal insert (1) which could lead to shorting of the electronics with the metal insert (1) absent the additional insulation provided by the polymer in the oversized aperture.

Although the molded polymer (4) that creates any edge, filled aperture, and filled space between the metal insert (1) and the opposite surface of the card can be injection molded using a variety of molten materials, the preferred method is to inject lower temperature two-part chemistries such as reactive injection molded polyurethane or other two-part resin systems. The lower temperature chemistries such as reactive injection molded polyurethane have critical benefits such as in-situ compliance with irregularly shaped electronic components and curing temperature ranges that are safe for temperature sensitive components such as batteries, thin displays, and various sensors. The opposite surface or rear layer (5) of the card (10) can be PVC or any other material suitable for printing, magnetic stripe application or other properties desired by consumers. The material used for the opposite surface must be adhesively compatible with the polymer material.

Although the foregoing detailed description is illustrative of preferred embodiments of the present invention, it is to be understood that additional embodiments thereof will be obvious to those skilled in the art. For example, a molded card (10) can be configured with a metal insert (1) having outside edges defining an outer perimeter of the molded card (10) while one or more apertures (3) are formed inside of the metal insert (1) whose purpose is to form interlocking shapes with molded polymer material (4) sandwiched between the metal insert (1) and the rear layer (5). Further modifications are also possible in alternative embodiments without departing from the inventive concept.

Accordingly, it will be readily apparent to those skilled in the art that still further changes and modifications in the actual concepts described herein can readily be made without departing from the spirit and scope of the disclosed inventions.

What is claimed is:

1. A transaction card having a metal surface, comprising:
a rear layer;
a metal insert including a main body and a lip extending perpendicularly away from the surface of an edge of the main body; and
a molded polymer material sandwiched between the rear layer and the metal insert, the molded polymer material including an edge that extends around the metal insert, such that the lip of the metal insert extends perpendicularly into an indentation of the molded polymer material that is defined by the edge of the molded polymer material;
wherein the metal insert is configured to be retained by a planar interlocking relationship between the metal insert and the molded polymer material via the lip of the metal insert and the indentation of the molded polymer material, so as to prevent delamination of the metal insert from the molded polymer material.

2. The transaction card of claim 1, wherein the molded polymer material fills a gap between the rear layer and the metal insert.

3. The transaction card of claim 1, wherein the metal insert is configured with an aperture that is defined by an aperture perimeter.

4. The transaction card of claim 3, further comprising a planar aperture edge shape extending perpendicularly away from the surface of an edge of the aperture perimeter, wherein the planar aperture edge extends perpendicularly into a payment module indentation of the molded polymer material that is defined by the edge of the molded polymer material, such that the planar aperture edge interlocks with the molded polymer material.

5. The transaction card of claim 3, further including:
an aperture lip extending perpendicularly towards the aperture from an edge of the aperture; and
the molded polymer material extending around the aperture lip.

6. The transaction card of claim 3, wherein the molded polymer material fills the aperture.

7. The transaction card of claim 6, wherein the aperture is configured to be larger than a payment module and the molded polymer material prevents shorting with the metal insert.

8. A transaction card having a metal surface, comprising:
a rear surface;
a metal insert including a main body and a payment module aperture extending through the main body and an aperture lip extending perpendicularly towards the payment module aperture from an edge of the payment module aperture; and
a molded polymer material, wherein the molded polymer material resides between the rear surface and the metal insert, and the molded polymer material fills the payment module aperture and extends around the aperture lip.

9. The transaction card of claim 8, further including:
a lip extending perpendicularly away from the surface of an edge of the main body; and
the molded polymer material including an edge that extends around the metal insert, such that the lip of the metal insert extends perpendicularly into an indentation of the molded polymer material that is defined by the edge of the molded polymer material;
wherein the metal insert is configured to be retained by a planar interlocking relationship between the metal insert and the molded polymer material via the lip of the metal insert and the indentation of the molded polymer material, so as to prevent delamination of the metal insert from the molded polymer material.

10. The transaction card of claim 8, wherein the molded polymer material fills a gap between the rear surface and the metal insert.

11. The transaction card of claim 8, further comprising a planar aperture edge shape extending perpendicularly away from the surface of an edge of the payment module aperture, wherein the planar aperture edge extends perpendicularly into a payment module indentation of the molded polymer material that is defined by the edge of the molded polymer material, such that the planar aperture edge interlocks with the molded polymer material.

12. The transaction card of claim 8, wherein the payment module aperture is configured to be larger than a payment module and the molded polymer material prevents shorting with the metal insert.

13. A transaction card having a metal surface, comprising:
a rear surface;
a metal insert including a main body and a payment module aperture extending through the main body and an aperture lip extending perpendicularly towards the payment module aperture from an edge of the payment module aperture; and
a molded polymer material, wherein the molded polymer material resides between the rear surface and the metal insert, and the molded polymer material fills the payment module aperture and extends around the aperture lip;
wherein the metal insert is configured to be retained by a planar interlocking relationship between the metal insert and the molded polymer material, so as to prevent delamination of the metal insert from the molded polymer material.

14. The transaction card of claim 13, further including:
a lip extending perpendicularly away from the surface of an edge of the main body; and
the molded polymer material including an edge that extends around the metal insert, such that the lip of the metal insert extends perpendicularly into an indentation of the molded polymer material that is defined by the edge of the molded polymer material;
wherein the metal insert is configured to be retained by a planar interlocking relationship between the metal insert and the molded polymer material via the lip of the metal insert and the indentation of the molded polymer material, so as to prevent delamination of the metal insert from the molded polymer material.

15. The transaction card of claim 13, wherein the molded polymer material fills a gap between the rear surface and the metal insert.

16. The transaction card of claim 13, further comprising a planar aperture edge shape extending perpendicularly away from the surface of an edge of the payment module aperture, wherein the planar aperture edge extends perpendicularly into a payment module indentation of the molded polymer material that is defined by the edge of the molded polymer material, such that the planar aperture edge interlocks with the molded polymer material.

17. The transaction card of claim 13, wherein the payment module aperture is configured to be larger than a payment module and the molded polymer material prevents shorting with the metal insert.

* * * * *